United States Patent
Kamijo et al.

(12) 
(10) Patent No.: US 6,611,305 B2
(45) Date of Patent: Aug. 26, 2003

(54) LIQUID CRYSTAL DISPLAY DEVICE AND ELECTRONIC APPARATUS

(75) Inventors: Kimitaka Kamijo, Suwa (JP); Eiji Okamoto, Suwa (JP); Keiji Takizawa, Suwa (JP)

(73) Assignee: Seiko Epson Corporation, Tokyo (JP)

(*) Notice: Subject to any disclaimer, the term of this patent is extended or adjusted under 35 U.S.C. 154(b) by 315 days.

(21) Appl. No.: 09/805,219

(22) Filed: Mar. 14, 2001

(65) Prior Publication Data
US 2001/0046010 A1 Nov. 29, 2001

(30) Foreign Application Priority Data

Mar. 14, 2000 (JP) ........................ 2000-070667
Nov. 7, 2000 (JP) ........................ 2000-339394

(51) Int. Cl.[7] .......................................... G02F 1/1335
(52) U.S. Cl. .................. 349/112; 349/106; 359/599
(58) Field of Search ................. 349/112, 106, 349/113, 96, 124; 359/589, 599, 592

(56) References Cited

U.S. PATENT DOCUMENTS

| 4,459,506 A | * | 7/1984 | Beck ........................... 313/315 |
| 5,759,643 A | * | 6/1998 | Miyashita et al. ........... 428/1.31 |
| 5,963,284 A | * | 10/1999 | Jones et al. ................. 349/112 |
| 6,239,852 B1 | * | 5/2001 | Oono et al. .................. 349/112 |
| 6,319,594 B1 | * | 11/2001 | Suzuki et al. ................ 428/208 |
| 6,340,404 B1 | * | 1/2002 | Oka et al. .................... 156/230 |
| 6,383,559 B1 | * | 5/2002 | Nakamura et al. ........... 427/180 |
| 6,383,620 B1 | * | 5/2002 | Aoyama et al. .............. 428/212 |
| 6,416,910 B1 | * | 7/2002 | Iimura et al. .................. 430/7 |
| 6,466,368 B1 | * | 10/2002 | Piepel et al. ................. 359/456 |
| 6,480,249 B2 | * | 11/2002 | Iwata et al. .................. 349/112 |
| 6,483,562 B1 | * | 11/2002 | Fukuyoshi et al. ......... 349/113 |

FOREIGN PATENT DOCUMENTS

| JP | A-7-98452 | 4/1995 |
| JP | A-10-260399 | 9/1998 |
| JP | A-10-301129 | 11/1998 |
| JP | A-11-281970 | 10/1999 |
| JP | A-2000-56125 | 2/2000 |

* cited by examiner

Primary Examiner—Robert H. Kim
Assistant Examiner—David Chung
(74) Attorney, Agent, or Firm—Oliff & Berridge, PLC

(57) ABSTRACT

As a dispersion in radius of fine particles contained in the resin is inappropriate, a liquid crystal display device exhibits coloring which varies with angles at which the liquid crystal display device is viewed. By selecting fine particles having such a dispersion in radius that a dispersion in light tristimulus values, X value, Y value, and Z value falls within 10% at each angle in the angle range from 5° to 20° with respect to the traveling direction of light coming into an optical scattering layer, an optical scattering layer from which the same color can be viewed even when a viewer views from different angles is prepared. The optical scattering layer can be a color filter.

9 Claims, 14 Drawing Sheets

[FIG. 1]
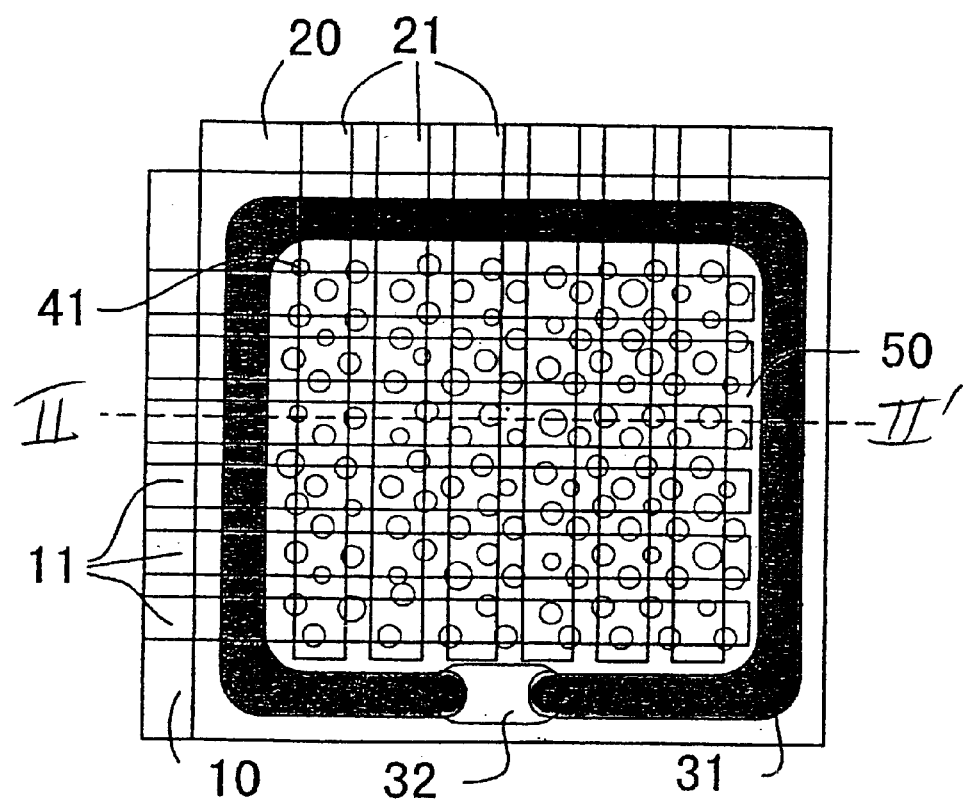

[FIG. 2]
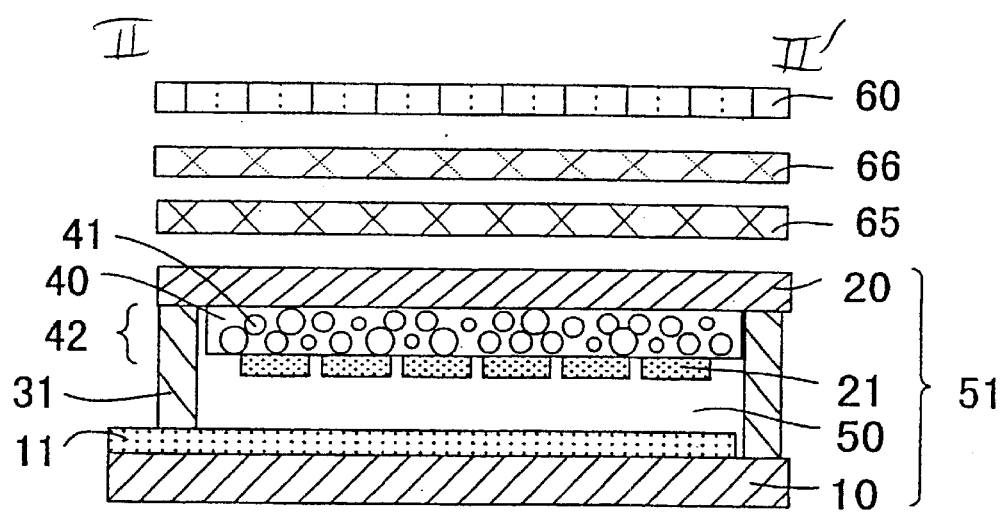

[FIG. 3]
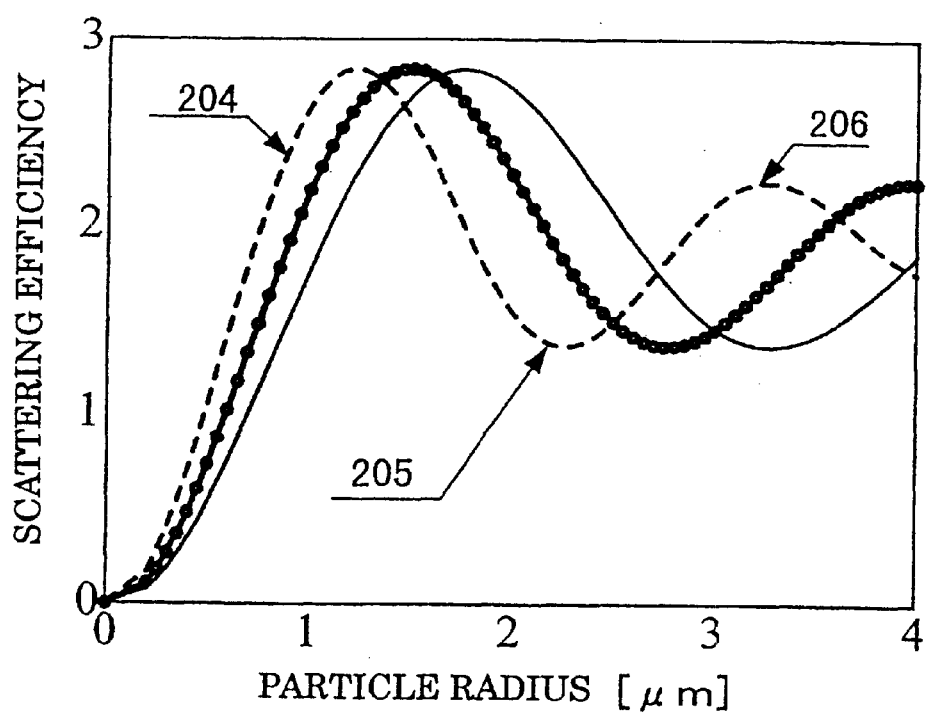

[FIG. 4]
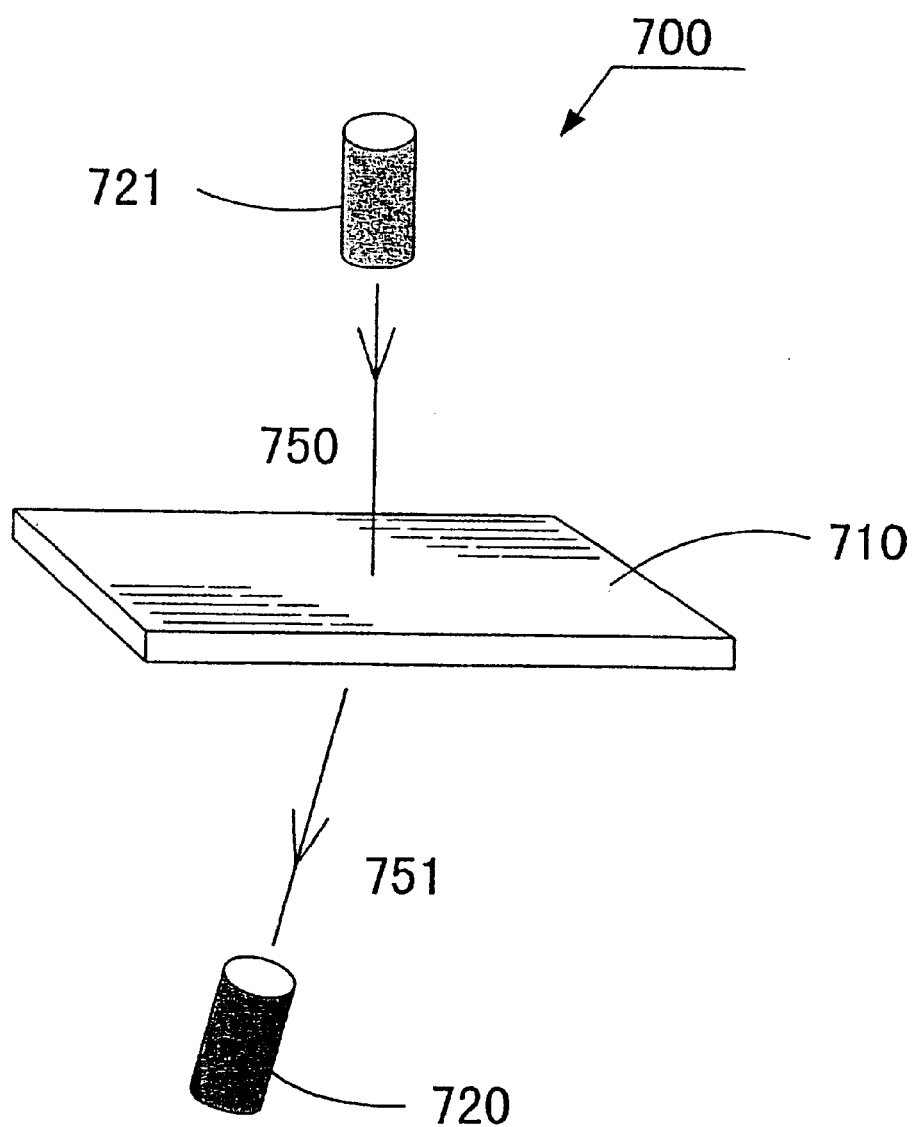

[FIG. 5]
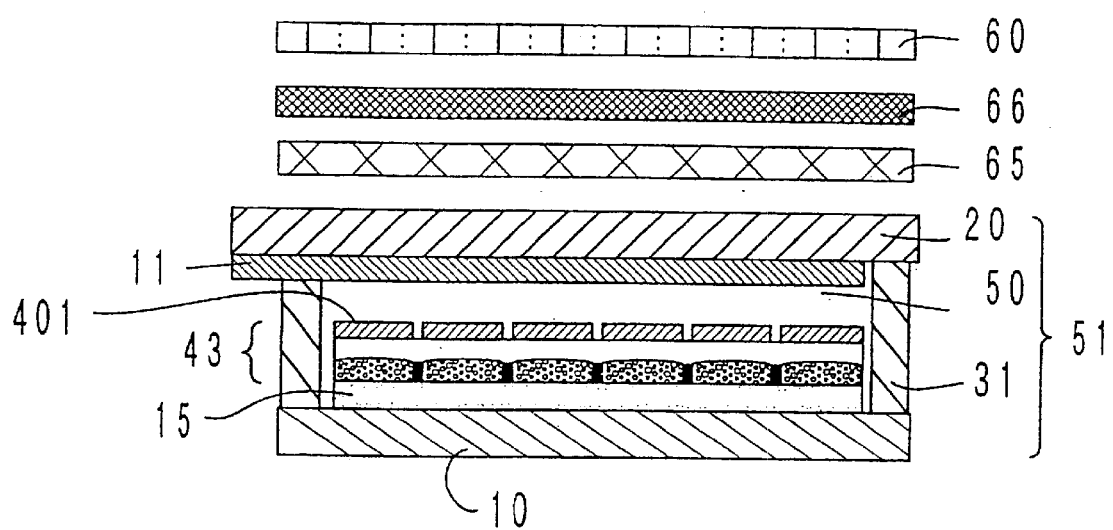

[FIG. 6]
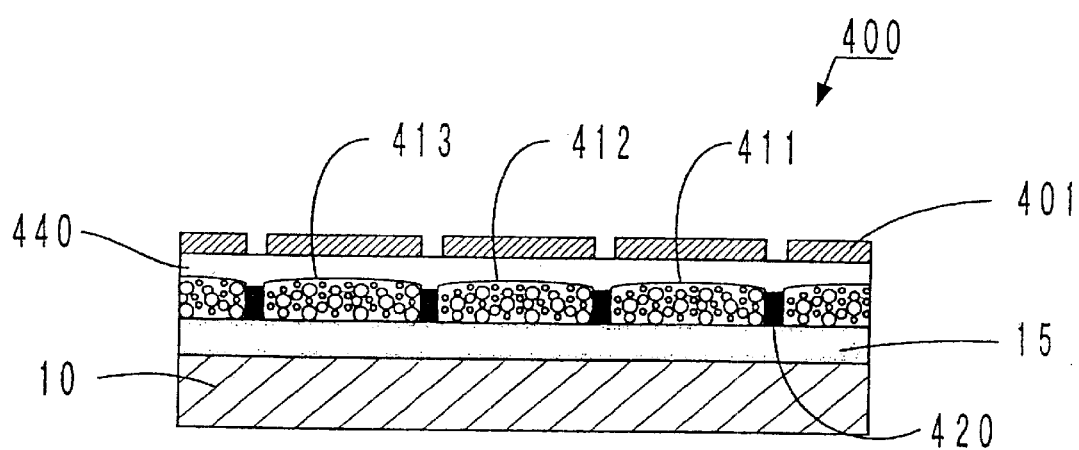

[FIG. 7]
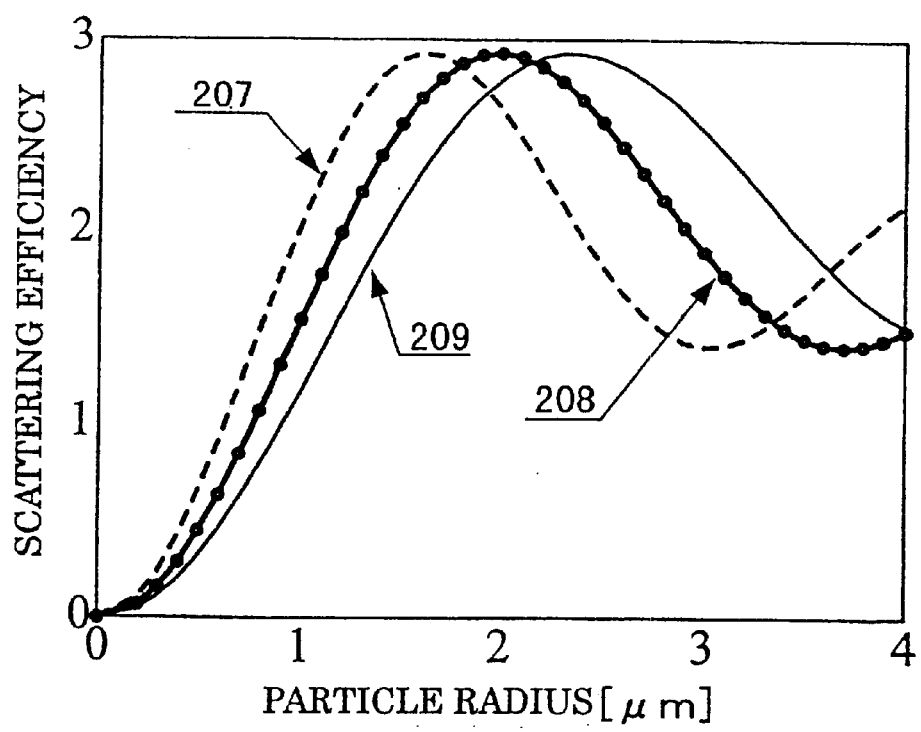

[FIG. 8]
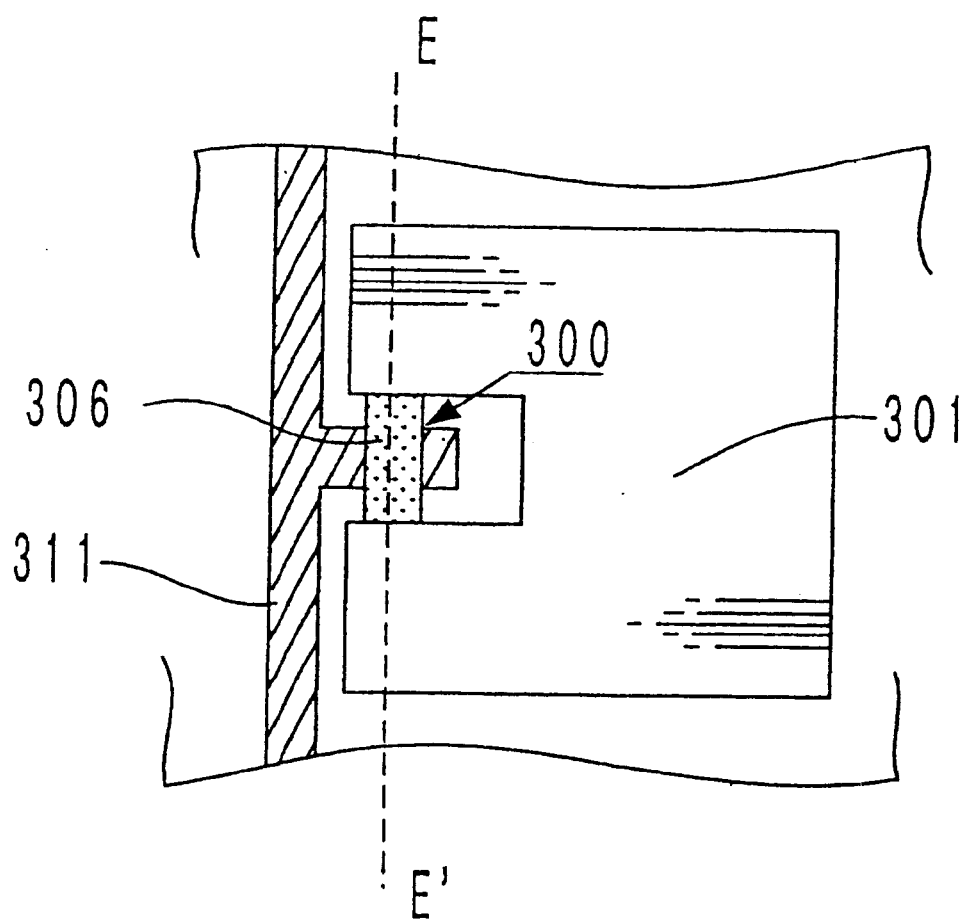

[FIG. 9]
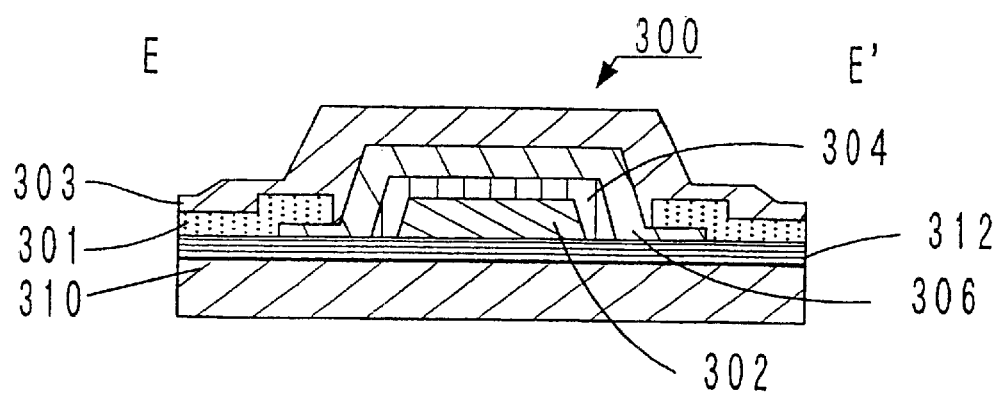

[FIG. 10]
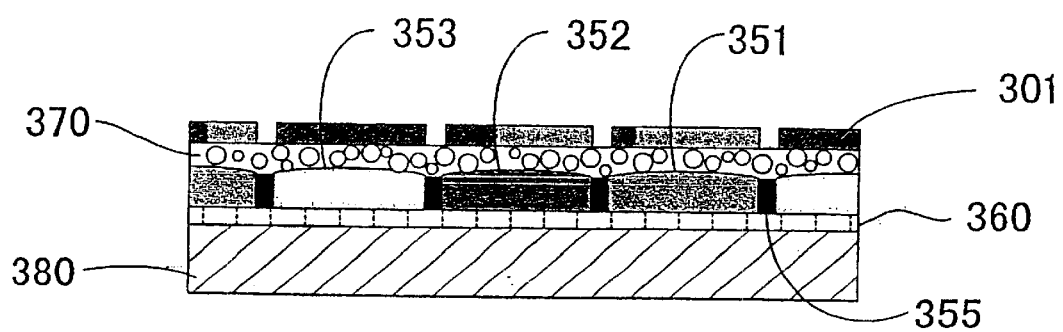

[FIG. 11]
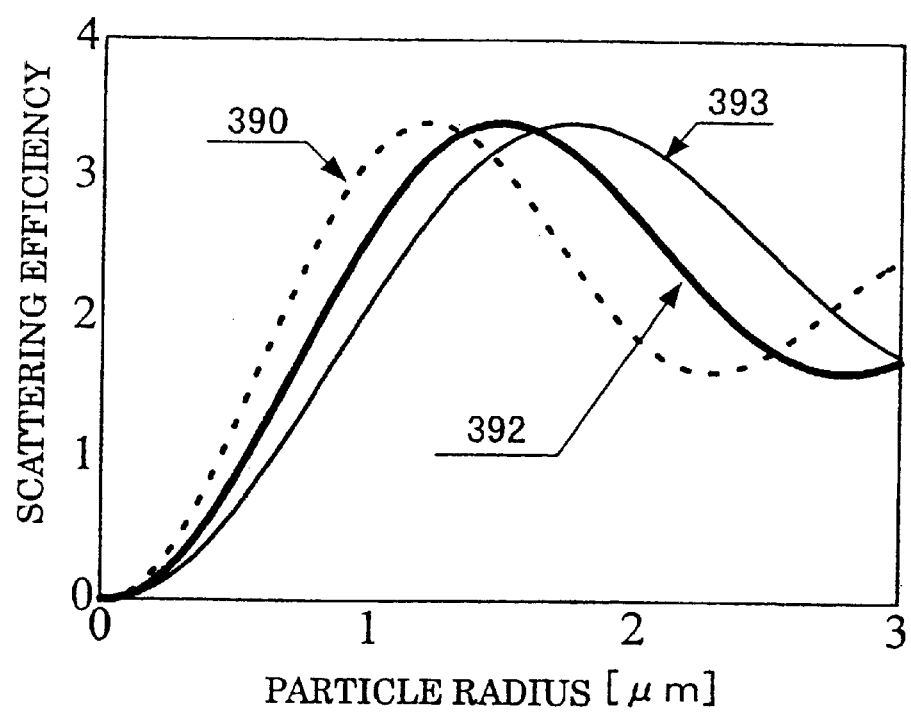

[FIG. 12]
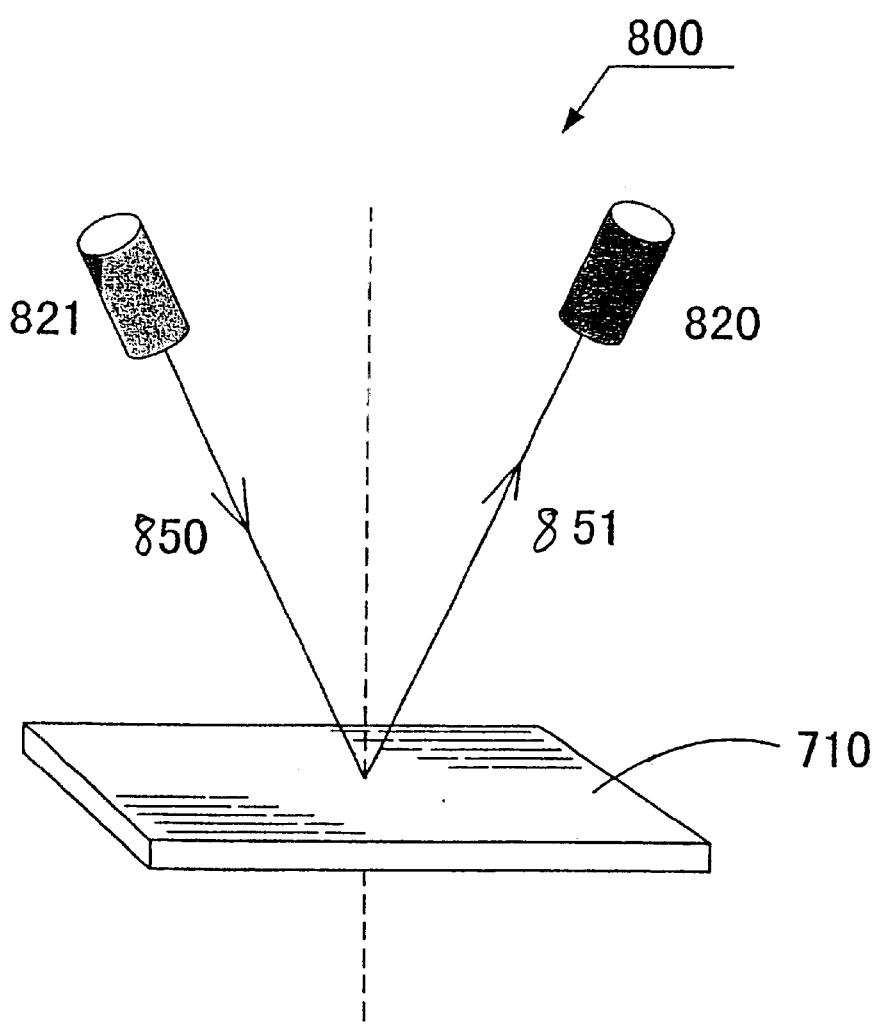

[FIG. 13]
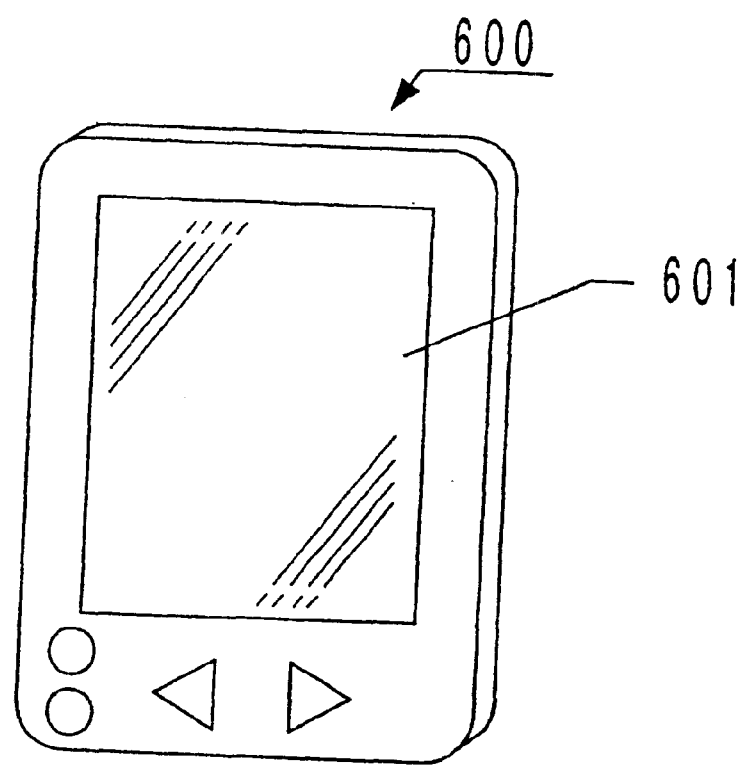

[FIG. 14]
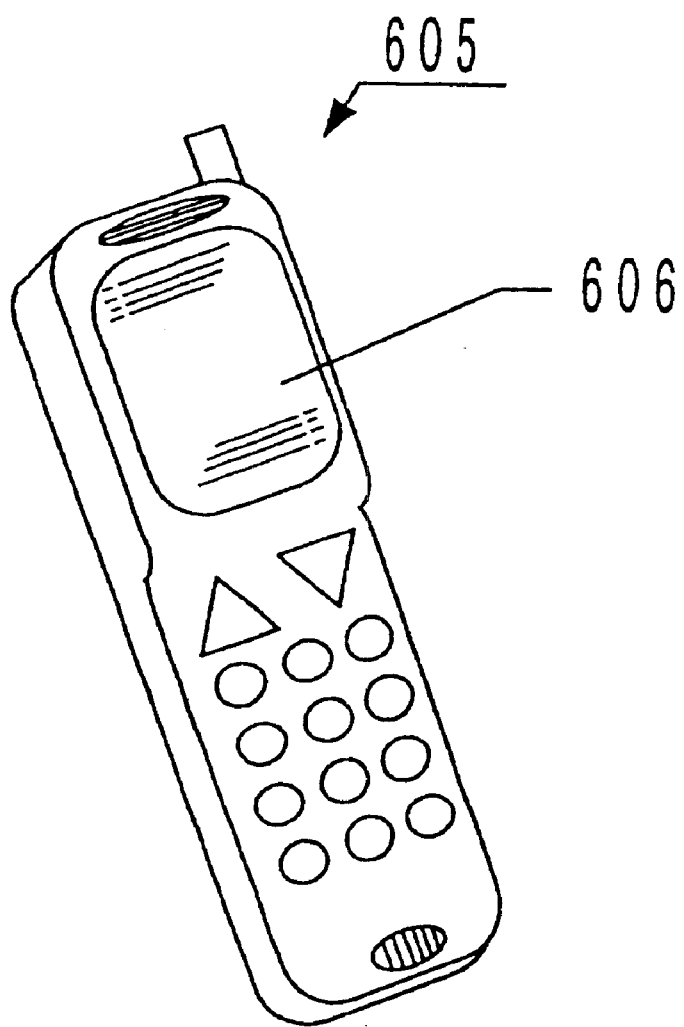

LIQUID CRYSTAL DISPLAY DEVICE AND ELECTRONIC APPARATUS

BACKGROUND OF THE INVENTION

1. Field of the Invention

The present invention relates to a liquid crystal display device for forming images by applying a voltage to a liquid crystal material held between substrates, and to an electronic apparatus using the liquid crystal display device. More specifically, the present invention relates to an optical scattering layer of a liquid crystal display device.

2. Description of Related Art

Liquid crystal display devices produce displays by controlling the polarizing direction of incoming light. Such liquid crystal display devices can be broadly divided into three types including a reflective liquid crystal display device which utilizes light coming in from the front face of the device, a transmissive liquid crystal display device which utilizes light coming in from the back face or side face of the device, and a transflective liquid crystal display device which has both functions of a reflective liquid crystal display device and of a transmissive liquid crystal display device.

Generally, these liquid crystal display devices have a layer which scatters outgoing light, in order to widen a display-recognition angle, i.e., a viewing angle of a viewer.

As one process for forming such an optical scattering layer, there is provided a forming process in which fine particles, which have a refractive index different from that of the resin, are kneaded and dispersed in a resin. The resulting article is applied onto the overall surface of a substrate by, for example, a spin coater process or a roller coating process. The applied article is cured, and then necessary portions are patterned.

SUMMARY OF THE INVENTION

As the dispersion in radius of fine particles kneaded in the resin is inappropriate, a liquid crystal display device exhibits coloring which varies with angles at which the liquid crystal display device is viewed. Accordingly, there is a problem in that a display in color which a designer intends cannot be produced at some viewing angles, to thereby deteriorate display quality. Additionally, there is a drawback in that the display darkens when displayed in color.

The present invention has been accomplished at least in view of the aforementioned circumstances. One object of the present invention is to at least provide a liquid crystal display device and an electronic apparatus in which a hue does not change with viewing angles, and which are bright and are legible and are excellent in display quality, even when the scattering efficiency of an optical scattering layer is increased.

In a liquid crystal display device according to one exemplary embodiment of the present invention, the liquid crystal display device includes a pair of substrates, liquid crystal held between the substrates, an electrode formed on at least one of opposite faces of the individual substrates, and an optical scattering layer which is formed on at least one of the substrates. The optical scattering layer may include a resin and fine particles which are dispersed in the resin and have different refractive indexes from that of the resin. The fine particles having such a dispersion in radius may be contained in the resin of the optical scattering layer that light which has passed through the optical scattering layer and has been scattered has a dispersion in light tristimulus values, X value, Y value, and Z value falling within 10% at each angle in an angle range from 5° to 20° with respect to the traveling direction of incoming light.

In this exemplary embodiment of the present invention, a configuration in which the optical scattering layer constitutes a color filter is desirable. According to this configuration, a display screen which exhibits no coloring regardless of viewing angles, is bright, and is legible even when a color filter is provided can be obtained.

Additionally, it is preferable that a transparent resin film for flattening is formed on a surface of the optical scattering layer. According to this configuration, a color filter constituting a flat optical scattering layer can be manufactured, and a high display quality can be obtained.

Additionally, it is desirable that the optical scattering layer is formed on an opposite face of at least one substrate of the pair of opposing substrates. According to such a configuration, a clear display can be obtained without blurring the display.

Alternatively, it is preferable that the optical scattering layer is formed on an outside face of at least one substrate of the pair of opposing substrates. By configuring like this, a bright and legible liquid crystal display device can be stably supplied at low cost.

Furthermore, it is preferable that an optical reflecting layer is formed on either face of one substrate which becomes the underside of the pair of opposing substrates when viewed from a viewer side, and the optical scattering layer is formed between the optical reflecting layer and a liquid crystal layer. By configuring like this, a liquid crystal display device which effectively uses an extraneous light and is low in power consumption can be provided.

Additionally, it is preferable that the fine particles having such a dispersion in radius are contained in the optical scattering layer so that, with respect to light coming in from the direction at an angle of 25° with respect to the direction of the normal line to the liquid crystal display device, light, which has passed through the optical scattering layer, has been reflected by the optical reflecting layer, has then passed through the optical scattering layer again, and has been scattered, has a dispersion in light tristimulus values, X value, Y value, and Z value falling within 10% at each angle in an angle range from 0° to −25° with respect to the direction of the normal line to the liquid crystal display device. By configuring like this, a liquid crystal display device in which a hue does not change with viewing angles, and which is legible and is excellent in display quality can be provided even when a display utilizing an extraneous light is produced.

Additionally, it is preferable that an optical reflecting layer is formed on either face of one substrate which becomes the underside of the pair of opposing substrates when viewed from a viewer side, and the optical scattering layer is formed on either face of one substrate which becomes the upper side when viewed from a viewer side. By configuring like this, a liquid crystal display device which effectively utilizes an extraneous light and is low in power consumption can be stably provided at low cost.

Additionally, it is preferable that the optical scattering layer is formed on the underside face of one substrate which becomes the underside of the pair of opposing substrates when viewed from a viewer side, and an optical reflective layer is formed on the surface of the optical scattering layer. By configuring like this, a liquid crystal display device which effectively utilizes an extraneous light and is low in power consumption can be stably supplied at low cost.

Furthermore, an electronic apparatus according to another exemplary embodiment the present invention includes the aforementioned liquid crystal display device. According to the exemplary embodiments of the present invention, a hue does not change with viewing angles, and a bright and high-contrast display screen can be obtained by optimizing the dispersion in radius of fine particles contained in a resin in the formation of an optical scattering layer.

BRIEF DESCRIPTION OF THE DRAWINGS

FIG. 1 is a schematic diagram of a liquid crystal display device as an exemplary embodiment of the present invention;

FIG. 2 is a sectional view taken along the line II–II' in FIG. 1;

FIG. 3 is a graph showing the relation of the scattering efficiency to the particle radius at wavelengths of 450 nm, 550 nm, 650 nm when fine particles have a refractive index of 1.35 and a transparent resin has a refractive index of 1.47;

FIG. 4 is a diagram showing an optical measuring system for the measurement of spectral characteristics of an optical scattering layer;

FIG. 5 is a sectional view of a liquid crystal display device as another exemplary embodiment of the present invention;

FIG. 6 is a partial enlarged plan view of a colored optical scattering layer of the liquid crystal display device as another exemplary embodiment of the present invention;

FIG. 7 is a graph showing the relation of the scattering efficiency to the particle radius at wavelengths of 450 nm, 550 nm, 650 nm when fine particles have a refractive index of 1.38 and a transparent resin has a refractive index of 1.47;

FIG. 8 is a partial enlarged plan view of a TFD of a liquid crystal display device as a further exemplary embodiment of the present invention;

FIG. 9 is a partial enlarged sectional view of a TFD of the liquid crystal display device as the further exemplary embodiment of the present invention;

FIG. 10 is a partial enlarged plan view of an optical scattering layer of the liquid crystal display device as the further exemplary embodiment of the present invention;

FIG. 11 is a graph showing the relation of the scattering efficiency to the particle radius at wavelengths of 450 nm, 550 nm, 650 nm when fine particles have a refractive index of 1.38 and a transparent resin has a refractive index of 1.59;

FIG. 12 is a diagram showing an optical measuring system for the measurement of spectral characteristics of an optical scattering layer;

FIG. 13 is a perspective view showing an electronic apparatus as an exemplary embodiment using the liquid crystal display device according to the present invention;

FIG. 14 is a perspective view showing an electronic apparatus as another exemplary embodiment using the liquid crystal display device according to the present invention.

DETAILED DESCRIPTION OF PREFERRED EMBODIMENTS (First Exemplary Embodiment)

The configuration of a first exemplary embodiment of the liquid crystal display device according to the present invention will be described below. The first embodiment is applied to a reflective liquid crystal display device of a passive matrix driving system, where FIG. 1 is a plan view showing a configuration of this reflective liquid crystal display device, and FIG. 2 is a sectional view taken along line II–II' in FIG. 1. In this connection, in FIGS. 1 and 2, each six strips of electrodes per row and per column are shown for convenience of description, but in actuality there are a multiplicity of electrodes. Additionally, in order to allow each layer and each member in FIG. 1 and FIG. 2 to have a recognizable level of size in the drawings, a reduction scale is differed in each layer and in each member.

In these figures, a polarizer 60 including a dichromatic coloring matter, and phase difference plates 66, 65 are located in the front (i.e., an upper surface in FIG. 2) of a liquid crystal cell 51. In this connection, it is illustrated as if there are gaps between individual components constituting the reflective liquid crystal display device, but this is for convenience of illustration. In actuality, the individual components are in a state that they are brought into nearly intimate contact with each other.

An extraneous light which has been transmitted through the polarizer 60 and has become linear polarized light becomes elliptic polarized light by transmitting through the phase difference plates 66, 65, and enters the liquid crystal cell 51. The polarization axis of the elliptic polarized light entering the liquid crystal cell 51 is selected by an applied voltage between a transparent common electrode 21 and a segment electrode 11 serving also as a reflector, and the elliptic polarized light is reflected by the segment electrode 11 serving also as an optical reflecting layer. The polarization axis of the reflected light is selected by an applied voltage between the segment electrode 11 and the common electrode 21, and the reflected light enters the phase difference plates 65, 66 and transmits through the polarizer 60. At this time, a bright display or a dark display can be selected by the selected polarization axis. In this case, the incoming extraneous light is widely scattered by a transmitting scattering layer 42 twice, and a bright display can be obtained.

Next, a more detailed configuration and a manufacturing process of the liquid crystal cell 51 will be described.

Initially, a segment substrate which constitutes an underside substrate (i.e., underside in FIG. 2) when viewed from a viewer will be described. First, a metal thin film composed of aluminum having the thickness of 1400 angstroms (140 nm) is formed on a first substrate 10 by a sputtering process, and the metal thin film is then patterned by the photolithography process to thereby form a segment electrode 11.

In the present embodiment, a metal reflective film composed of aluminum is used as an optical reflecting layer, but any of optical layers that can reflect visible light is accepted and thin films of metals other than aluminum, dielectric thin films, cholesteric liquid crystal layers and the like can also be used.

Subsequently, a common substrate on which the optical scattering layer 42 is formed will be described.

The optical scattering layer 42 is formed in the following manner. Fine particles 41 composed of a fluorine-containing resin (refractive index: 1.35) having a dispersion in radius is kneaded in the proportion of 15% by weight ratio with a transparent acrylic polymer (refractive index: 1.47) 40, and a film of the kneaded article is formed to the film thickness of about 5 μm on the surface of a transparent second substrate 20 by the spin coating process, and is then patterned by the photolithography process to thereby form the optical scattering layer 42 in a pixel part.

Additionally, a transparent conductor composed of, for example, ITO is formed to the thickness of 1400 angstroms (140 nm) by the vapor deposition process or the sputtering process, and is patterned by the photolithography process to thereby form a common electrode 21.

In this case, as the fine particles to be kneaded, fine particles having such a dispersion in radius were selected such that light which has passed through the optical scattering layer and has been scattered has a dispersion in light tristimulus values, X value, Y value, and Z value falling within 10% at each angle in an angle range from 5° to 20° with respect to the traveling direction of incoming light.

FIG. 3 shows individual relation curves 204, 205, 206 of scattering efficiencies to particle radius at wavelengths of 450 nm, 550 nm, 650 nm in case that the fine particles have a refractive index of 1.35 and the resin has a refractive index of 1.47. In FIG. 3, the particle radius with which light of 450 nm can yield the maximum scattering efficiency is 1.2 μm, and the particle radii with which light of wavelengths of 550 nm, 650 nm can yield the maximum scattering efficiency are 1.5 μm, 1.8 μm, respectively. Accordingly, in the present embodiment, fine particles having radii of 1.2 μm, 1.5 μm, 1.8 μm were kneaded in the same proportion.

In this connection, an acrylic polymer is used as a transparent resin in the present embodiment, but any resin that has a low birefringence and is resistant to heat treatment or chemical treatment in liquid crystal display manufacturing processes is accepted. For example, epoxy resins (refractive index: 1.56 to 1.66), polyester resins (refractive index: 1.51 to 1.57), silicone resins (refractive index: 1.35 to 1.48), and polyimide resins (refractive index: 1.57 to 1.69) can be used.

Additionally, fine particles composed of a fluorine-containing resin are used as fine particles in the present embodiment, but fine particles composed of inorganic matters, in addition to organic polymers, can also be used as the fine particles.

As examples of the fine particles composed of organic polymers, there may be mentioned polytetrafluoroethylene (PTFE), perfluoroalkoxy resins (PFA), tetrafluoroethylene-hexafluoropropylene copolymers (ETFE), polyfluorovinyl (PVF), and other fluorine-containing polymers. The refractive indexes of these fluorine-containing polymers are 1.35, 1.35, 1.40, 1.35, respectively.

Furthermore, matters obtained by adding fluorine atoms or fluorinated alkyl groups to the other polymers are also accepted. Additionally, fine particles obtained by applying an appropriate surface treatment to surfaces of these organic polymers are also accepted. Examples of such surface treatments include a treatment in which, for example, $SiO_2$, $ZrO_2$, $Al_2O_3$, ZnO, a transparent resin, a coupling agent, or a surfactant is applied to the surface.

In addition, as examples of fine particles composed of inorganic matters, fine particles having a cubic crystal structure, fine particles having a tetragonal structure, amorphous fine particles be used. Specifically, for example, $CaF_2$, $MgF_2$, $LaF_3$, $LiF_2$, NaF, and other fluorine compounds can be mentioned. The refractive indexes of these fluorine compounds are 1.43, 1.38, 1.59, 1.39, 1.34, respectively.

Subsequently, an orientation film is applied to opposite faces of the segment substrate and common substrate prepared according to the aforementioned process, and is subjected to the rubbing process, and two substrates 10, 20 are then bonded together via sealant 31 in such a manner that the segment electrode 11 and common electrode 21 are orthogonal to each other, and a liquid crystal material 50 is encapsulated into a gap between the two substrates and is sealed by sealing member 32 to thereby yield a liquid crystal display device.

Then, the present inventors made a measurement, with a spectrometer, of a sample 710 including the aforementioned optical scattering layer 42 formed on a glass substrate and made measurements of the light tristimulus values, X value, Y value, and Z value of scattered light from the optical scattering layer 42 in the range from 5° to 20° with respect to the traveling direction of light coming into the optical scattering layer 42.

Here, FIG. 4 shows an optical measuring system 700. Incoming light 750 exits from a light-outgoing unit 721 in a direction perpendicular to the sample 710 which includes the optical scattering layer 42 formed on a glass substrate. The incoming light 750 enters the sample 710 and is scattered, and scattered light 751 then enters a light-receiving unit 720 of the spectrometer. At this time, the light-receiving unit 720 can travel in the range from 0° to 60° with respect to the incoming light 750. The light tristimulus values, X value, Y value, and Z value, measured in this manner at angles formed between the incoming light 750 and the scattered light 751 of 5°, 10°, 15°, 20° are shown in Table 1.

TABLE 1

|         | 5°    | 10°   | 15°   | 20°   |
|---------|-------|-------|-------|-------|
| X value | 0.494 | 0.269 | 0.152 | 0.076 |
| Y value | 0.477 | 0.271 | 0.146 | 0.077 |
| Z value | 0.453 | 0.260 | 0.138 | 0.074 |

Here, individual X value, Y value, and Z value are values when the incoming light 750 is defined as 100. At this time, as a dispersion in light tristimulus values X value, Y value, and Z value falls within 10% at each angle in the range from 5° to 20°, the light scattered by the scattering layer 42 is not colored, and a hue does not change with viewing angles of the liquid crystal display device. Accordingly, the color expressive power of the liquid crystal display device is not deteriorated.

Here in the present embodiment, the optical scattering layer 42 is located inside the pair of opposing substrates, but it can be located between the second substrate 20 and the phase difference plate 65.

Alternatively, the optical scattering layer 42 can be located between the segment electrode 11 serving also as an optical reflecting layer and the first substrate 10.

Additionally, the segment electrode serving also as an optical reflecting layer can be composed of a transparent conductive thin film of, for example, ITO, and the optical reflecting layer can be located on the underside of the first substrate. In this case, an optical scattering layer 43 can be formed between the optical reflecting layer and the first substrate.

In this connection, the present embodiment has been described by taking a reflective liquid crystal display device of passive matrix driving with monochrome display as an example, but it can also be applied to a liquid crystal display device of active matrix driving system using, for example, a TFT (Thin Film Transistor) element or a TFD (Thin Film diode) element. It can also be a transmissive liquid crystal display device. Additionally, it is accepted to provide color filters corresponding to individual pixels between the second substrate 20 and the optical scattering layer 42 to thereby yield a liquid crystal display device that can produce a color display.

(Second Exemplary Embodiment)

A second exemplary embodiment of the present invention is applied to a reflective liquid crystal display device of passive matrix driving system.

Here, FIG. 5 is a sectional view of a reflective liquid crystal display device according to the present invention. In this connection, six strips of electrodes are shown in FIG. 5 for convenience of description, but in actuality there are a multiplicity of electrodes. Additionally, in order to allow each layer and each member in FIG. 5 to have a recognizable level of size in the drawing, a reduction scale is differed per layer and per member.

Initially, in FIG. 5, a polarizer 60 including dichromatic coloring matter and phase difference plates 66, 65 are located in the front (i.e., an upper surface in FIG. 5) of a liquid crystal cell 51. In this connection, it is illustrated as if there are gaps between individual components constituting the reflective liquid crystal display device, but this is for convenience of illustration. In actuality, the individual components are in a state that they are brought into nearly intimate contact with each other.

An extraneous light which has been transmitted through the polarizer 60 and has become linear polarized light becomes elliptic polarized light by transmitting through the phase difference plates 66, 65, and enters the liquid crystal cell 51. The polarization axis of the elliptic polarized light entering the liquid crystal cell 51 is selected by an applied voltage between a transparent common electrode 401 and a segment electrode 11, and the elliptic polarized light is reflected by an aluminum thin film 15 as an optical reflecting layer. The polarization axis of the reflected light is selected by an applied voltage between the segment electrode 11 and the common electrode 401, and the reflected light enters the phase difference plates 65, 66 and transmits through the polarizer 60. At this time, a bright display or a dark display can be selected by the selected polarization axis. In this case, the incoming extraneous light is widely scattered by transmitting through a scattering layer 43 twice, and a bright display can be obtained. Additionally, as the scattering layer 43 constitutes a color filter, light exiting from the liquid crystal device is colored.

Next, a more detailed configuration and a manufacturing process of the liquid crystal cell 51 will be described.

Here, FIG. 6 is a sectional view of a common substrate 400 on which the scattering layer 43 is formed. Initially, a common substrate which constitutes an underside substrate (i.e., underside in FIG. 5) when viewed from a viewer will be described. First, an optical reflecting layer composed of aluminum thin film 15 having a thickness of 1400 angstroms (140 nm) is formed on a first substrate 10 by a sputtering process.

Subsequently, a photosensitive organic film containing carbon black is applied by a spin coating process to the thickness of 2 μm on the common substrate on which the optical reflecting layer is formed, and a pattern having the width of 20 μm is then prepared by a photolithography process to thereby form a black strip 420.

Additionally, fine particles composed of a silicone-based resin (refractive index: 1.38) having a dispersion in radius are kneaded in the proportion of 15% by weight ratio with photosensitive acrylic resins (refractive index: 1.47) each containing a red, blue, or green coloring matter, and the kneaded article is then applied by the spin coating process, and color filters 411, 412, 413 serving also as optical scattering layers are then respectively formed by the photolithography process.

Additionally, a transparent acrylic resin layer 440 is applied and is flattened, and a transparent conductor such as ITO is then formed to the thickness of 1400 angstroms (140 nm) by a vapor deposition process or a sputtering process, and is patterned by the photolithography process to thereby form a common electrode 401.

In this case, as the fine particles to be kneaded, fine particles having a dispersion in radius were selected such that light which has passed through the optical scattering layer and has been scattered has a dispersion in tristimulus values, X value, Y value, and Z value falling within 10% at each angle in the angle range from 5° to 20° with respect to the traveling direction of incoming light.

FIG. 7 shows individual relation curves 207, 208, 209 of scattering efficiencies to particle radius at wavelengths of 450 nm, 550 nm, 650 nm in case that the fine particles have a refractive index of 1.38 and the resin has a refractive index of 1.47.

In FIG. 7, the particle radius with which light of 450 nm can yield the maximum scattering efficiency is 1.2 μm, and the particle radii with which light of wavelengths of 550 nm, 650 nm can yield the maximum scattering efficiency are 1.5 μm, 1.8 μm, respectively. Accordingly, in the present embodiment, fine particles having radii of 1.2 μm, 1.5 μm, 1.8 μm were kneaded in the same proportion.

Additionally, as the coloring matters contained in the photosensitive acyclic resin, there may be mentioned conventionally used monoazo-based, diazo-based, metal-complex-salt-based, anthraquinone-based, phthalocyanine-based, triallylmethane-based, and other oily dyes, carbon black, titanium oxide, zinc white (zinc oxide), zinc sulfide, and other inorganic pigments, as well as monoazo-based, diazo-based, phthalocyanine-based, quinacridone-based, and other organic pigments. For example, as coloring matters for blue (B), green (G), red (R) heavily used in liquid crystal display devices, there may be mentioned (B) phthalocyanine blue, (G) phthalocyanine green, and (R) brilliant carmin, respectively.

A metal reflective film composed of aluminum is used as an optical reflecting layer in the present embodiment, but any of optical layers that can reflect visible light is accepted and thin films of metals other than aluminum, dielectric thin films, cholesteric liquid crystal layers and the like can also be used.

Next, a common substrate will be described. A transparent conductor composed of, for example, ITO is formed to the thickness of 1400 angstroms (140 nm) on a second substrate 20 by the vapor deposition process or the sputtering process, and is patterned by the photolithography process to thereby form a common electrode 11.

Subsequently, an orientation film is applied to opposite faces of the segment substrate and common substrate prepared according to the aforementioned process and is subjected to a rubbing process, and the two substrates 10, 20 are then bonded together via sealant 31 in such a manner that the common electrode 401 and the segment electrode 11 are orthogonal to each other, and a liquid crystal material 50 is encapsulated into a gap between the two substrates and is sealed by a sealing member to thereby yield a liquid crystal display device.

Here, a measurement of a sample in which the aforementioned optical scattering layer 43 is formed on a glass substrate was made with a spectrometer in the same manner as in the first embodiment. The light tristimulus values, X value, Y value, and Z value, measured in this manner at angles formed between incoming light and scattered light of 5°, 10°, 15°, 20° are shown in Table 2.

TABLE 2

|         | 5°    | 10°   | 15°   | 20°   |
|---------|-------|-------|-------|-------|
| X value | 0.458 | 0.190 | 0.146 | 0.071 |
| Y value | 0.481 | 0.192 | 0.152 | 0.076 |
| Z value | 0.499 | 0.208 | 0.155 | 0.078 |

Here, as a dispersion in light tristimulus values X value, Y value, and Z value falls within 10% at each angle in the range from 5° to 20°, the light scattered by the scattering layer 43 is not colored, and a hue does not change with viewing angles of the liquid crystal display device. Accordingly, the color expressive power of the liquid crystal display device is not deteriorated.

Here in the present embodiment, the optical scattering layer 43 is located on an opposite face of the pair of opposite substrates, but it can be located between the second substrate 20 and the phase difference plate 65.

Alternatively, an optical scattering layer 43 can be located between the segment electrode 401 and the second substrate 20.

Additionally, an optical reflecting layer 15 can be located on the outside of the first substrate 10. In this case, the optical scattering layer 43 can be formed between the optical reflecting layer 15 and the first substrate 10.

In this connection, the present embodiment has been described by taking a color liquid crystal display device of passive matrix driving as an example, but it can also be applied to a liquid crystal display device of active matrix driving system using, for example, a TFT (Thin Film Transistor) element or a TFD (Thin Film diode) element. It can also be a transmissive liquid crystal display device.

(Third Exemplary Embodiment)

Next, a liquid crystal display device according to a third exemplary embodiment of the present invention will be described. The present embodiment is applied to a reflective liquid crystal display device of active matrix driving that can produce a color display using a TFD element. As the principles as a display device are the same as in the second embodiment and therefore are omitted.

Initially, a TFD element 300 will be described using FIG. 8 and FIG. 9.

The TFD element 300 is formed on an insulating film 312 which is formed on a first substrate 310, and serves as an underlayer. It is composed of a first metal film 302, an insulating layer 304, and a second metal film 306 in this order from the insulating film 312 side, and has a TFD structure (Thin Film Diode structure) or a MIM structure (Metal Insulator Metal structure). The first metal film 302 of the TFD element 300 is connected to a wire 311 which is formed on the first substrate 310 and serves as a data line or a scanning line, and the second metal film 306 is connected to a transparent electrode 301 composed of ITO.

The insulating film 312 is composed of, for example, tantalum oxide. However, the insulating film 312 is formed with principle purposes to avoid delamination of the first metal film 302 from the underlayer due to heat treatment performed, for example, after the deposition of the second metal film 306, and to avoid the diffusion of impurities from the underlayer to the first metal film 302. Accordingly, if such delamination and dispersion of impurities become trivial by, for example, configuring the first substrate 310 from, for example, a quartz substrate and other substrates excellent in heat resistance and purity, the insulating film 312 can be omitted. The first metal film 302 is composed of a conductive metal thin film and is composed of, for example, elementary tantalum or a tantalum alloy. The insulating film 304 is composed of, for example, an oxide film formed on a surface of the first metal film 302 by anodic oxidation in a formation solution. The second metal film 306 is composed of a conductive metal thin film and is composed of, for example, elementary chromium or a chromium alloy.

Additionally, a transparent insulating film 303 is formed on a side of a transparent electrode 301, the TFD element 300, the scanning line 311 and the like facing the liquid crystal (i.e., an upper surface in FIG. 9).

Next, a common substrate on which an optical scattering layer and an optical reflecting layer are formed will be described using FIG. 10.

Initially, an optical reflecting layer composed of an aluminum tin film 360 having the thickness of 1400 angstroms (140 nm) is formed on a second substrate 380 by the sputtering process.

Subsequently, a photosensitive resin film containing carbon black is applied by the spin coating process to the thickness of 2 μm to the common substrate on which the optical reflecting layer is formed, and a pattern having the width of 20 μm is prepared by the photolithography process to thereby form black strips 355.

Additionally, photosensitive acrylic resins each containing a red, blue, or green coloring matter are applied by the spin coating process and color filters 351, 352, 353 are respectively formed by the photolithography process.

Additionally, fine particles composed of a styrenic resin (refractive index: 1.38) are kneaded in the proportion of 30% by weight ratio with a transparent acrylic resin (refractive index: 1.59), and the kneaded article is applied by the spin coating process and an optical scattering layer 370 is formed by the photolithography process.

In this case, as the fine particles to be kneaded, fine particles having a dispersion in radius were selected such that, with respect to light coming in from a direction at 25° with respect to the direction of the normal line to the second substrate 380, a dispersion in light tristimulus values, X value, Y value, and Z value of light which has passed through the optical scattering layer and has been scattered falls within 10% at each angle in the angle range from 0° to −25° with respect to the direction of the normal line to the second substrate 380.

FIG. 11 shows individual relation curves 390, 392, 393 of scattering efficiencies to particle radius at wavelengths of 450 nm, 550 nm, and 650 nm.

In FIG. 11, the particle radius with which light of 450 nm can yield the maximum scattering efficiency is 1.2 μm, and the particle radii with which light of wavelengths of 550 nm, 650 nm can yield the maximum scattering efficiency are 1.5 μm, 1.8 μm, respectively. Accordingly, in the present embodiment, fine particles having radii of 1.2 μm, 1.5 μm, 1.8 μm were kneaded in the same proportion.

Additionally, a transparent conductor composed of ITO is formed to the thickness of 1400 angstroms (140 nm) by the vapor deposition process or the sputtering process, and is patterned by the photolithography process to thereby form common electrodes 301 in strips.

Subsequently, an orientation film is applied to opposite faces of the segment substrate and common substrate prepared according to the aforementioned process and is subjected to the rubbing process, and the two substrates are then bonded together via a sealant in such a manner that a wire 311 and a common electrode 301 are orthogonal to each other, and a liquid crystal material is encapsulated into a gap between the two substrates and is sealed by a sealing member to thereby yield a liquid crystal display device.

Here, a measurement of the aforementioned liquid crystal display device was made with a spectrometer. In this manner, measurements were made of tristimulus values, X value, Y value, and Z value of light which had passed through the optical scattering layer, had been reflected by the optical reflector, had passed through the optical scattering layer and had been scattered in the range from 0° to −25° with respect to the direction of the normal line to the aforementioned liquid crystal display device, with respect to incoming light from the direction of at the angle of 25° with respect to the direction of the normal line to the liquid crystal display device.

Here, FIG. 12 shows an optical measuring system 800. Incoming light 850 is allowed to exit from a light-outgoing unit 821 at the angle of 25° with respect to the direction of the normal line to the liquid crystal display device. The incoming light enters a liquid crystal display device 810, passes through the light scattering layer, is reflected by the optical reflecting layer, passes through the optical scattering layer and is scattered. Scattered light 851 then enters a light-receiving unit 820 of the spectrometer. At this time, the light-receiving unit 820 can travel in the range from 0° to −25° with respect to the direction of the normal line to the liquid crystal display device. The light tristimulus values, X value, Y value, and Z value, measured in this manner at angles formed between the direction of the normal line to the liquid crystal display device and scattered light 851 of −5°, −10°, −15°, −20° are shown in Table 3.

TABLE 3

|         | −5°   | −10°  | −15°  | −20°  |
|---------|-------|-------|-------|-------|
| X value | 0.146 | 0.282 | 0.475 | 0.574 |
| Y value | 0.146 | 0.263 | 0.461 | 0.608 |
| Z value | 0.158 | 0.277 | 0.432 | 0.634 |

Here, the individual X value, Y value, and Z value are values when incoming light 850 is defined as 100. At this time, as a dispersion in light tristimulus values X value, Y value, and Z value falls within 10% at each angle in the range from −5° to −20°, the light scattered by the scattering layer 370 is not colored, and a hue does not change with viewing angles of the liquid crystal display device. Accordingly, the color expressive power of the liquid crystal display device is not deteriorated.

(Fourth Exemplary Embodiment)

FIG. 13 shows an exemplary embodiment of an electronic apparatus according to the present invention. This exemplary embodiment is an electronic book, and is a kind of mobile data terminals. Reference numeral 600 indicates an electronic book body, of which reference numeral 601 indicates a liquid crystal display unit using the liquid crystal display device according to the present invention.

Additionally, FIG. 14 shows a portable telephone as another exemplary embodiment of the present invention. Reference numeral 605 indicates a portable telephone body, of which reference numeral 606 indicates a liquid crystal display unit using the liquid crystal display device according to the present invention. These electronic apparatuses include the aforementioned liquid crystal display device according to the present invention, and therefore, have a wide viewing angle and have a bright and high-contrast clear display screen.

According to the present invention, a hue does not change with viewing angles of a liquid crystal display device, and a color which a designer intends can be seen regardless of angle. Particularly, when the liquid crystal display device is prepared as a liquid crystal display device with a color display, the range of colors which the liquid crystal display device can express is widened and the resulting liquid crystal display device can have a lot of expressive power. Additionally, as a dispersed light can be effectively used, the resulting liquid crystal display device can be bright and high in contrast.

What is claimed is:

1. A liquid crystal display device, comprising:

a pair of substrates;

liquid crystal held between said substrates;

an electrode formed on at least one of opposite faces of said substrates; and an optical scattering layer formed on at least one of said substrates, said optical scattering layer including a resin and fine particles, said fine particles being dispersed in said resin and having different refractive indexes from that of said resin, said fine particles having such a dispersion in radius being contained in said resin of said optical scattering layer that light which has passed through said optical scattering layer and has been scattered has a dispersion in light tristimulus values, X value, Y value, and Z value falling within 10% at each angle in an angle range from 5° to 20° with respect to a traveling direction of incoming light.

2. The liquid crystal display device according to claim 1, said optical scattering layer constituting a color filter.

3. The liquid crystal display device according to claim 1, further comprising a transparent resin film for flattening formed on a surface of said optical scattering layer.

4. The liquid crystal display device according to claim 1, said optical scattering layer being formed on an opposite face of at least one of said pair of substrates.

5. The liquid crystal display device according to claim 1, said optical scattering layer being formed on an outside face of at least one of said pair of substrates.

6. The liquid crystal display device according to claim 1, further comprising an optical reflecting layer formed on one face of one substrate which becomes an underside of said pair of substrates when viewed from a viewer side, and said optical scattering layer being formed between said optical reflecting layer and a liquid crystal layer.

7. The liquid crystal display device according to claim 6, fine particles having such a dispersion in radius being contained in said optical scattering layer such that, with respect to light coming in from a direction at an angle of 25° with respect to a direction of a normal line to said liquid crystal display device, light which has passed through said optical scattering layer, has been reflected by said optical reflecting layer, has passed through said optical scattering layer again, and has been scattered has a dispersion in light tristimulus values, X value, Y value, and Z value falling within 10% at each angle in an angle range from 0° to −25° with respect to the direction of the normal line to said liquid crystal display device.

8. The liquid crystal display device according to claim 1, further comprising an optical reflecting layer formed on one face of one substrate which becomes an underside of said pair of substrates when viewed from a viewer side, said optical scattering layer being formed on one face of one substrate which becomes an upper side when viewed from a viewer side.

9. An electronic apparatus comprising a liquid crystal display device according to claim 1.

* * * * *